(12) United States Patent
Daiku

(10) Patent No.: US 7,483,102 B2
(45) Date of Patent: Jan. 27, 2009

(54) SURFACE LIGHT SOURCE FOR EMITTING LINEARLY-POLARIZED LIGHT WHOSE POLARIZATION PLANE IS VARIED DEPENDING ON EMISSION DIRECTION AND VIEW ANGLE CHANGEABLE LIQUID CRYSTAL DISPLAY APPARATUS USING SAME

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 298 days.

(21) Appl. No.: 11/541,305

(22) Filed: Sep. 29, 2006

(65) Prior Publication Data
US 2007/0076149 A1    Apr. 5, 2007

(30) Foreign Application Priority Data
Sep. 30, 2005    (JP)    ............................. 2005-286353

(51) Int. Cl.
*G02F 1/133*    (2006.01)
(52) U.S. Cl. ..................................................... 349/116
(58) Field of Classification Search ................. 349/113, 349/114, 115, 116, 117, 119, 120, 15, 18, 349/5, 96
See application file for complete search history.

(56) References Cited
U.S. PATENT DOCUMENTS
2003/0210365 A1*  11/2003  Koyama et al. ............. 349/113

2004/0125292 A1*  7/2004  Maeda ........................ 349/117
2006/0125984 A1*  6/2006  Park et al. ................... 349/114

FOREIGN PATENT DOCUMENTS
JP    2004-133334 A    4/2004

\* cited by examiner

*Primary Examiner*—Quyen P Leung
(74) *Attorney, Agent, or Firm*—Frishauf, Holtz, Goodman & Chick, P.C.

(57) ABSTRACT

The invention has light source unit disposed at opposite side to observer side of liquid crystal display device for selectively emitting linearly-polarized light and non-polarized light, and retardation element disposed between liquid crystal display device and light source unit. Plurality of first and second layers whose slow axes are arranged in different directions are alternately arranged on a surface of retardation element that faces light source unit, and plurality of third and fourth layers whose slow axes are arranged in different directions are arranged on the other surface, such that third layers face first layers and fourth layers face second layers. First to fourth layers are arranged such that polarization plane of light passing through first and third layers and second and fourth layers is rotated by 90°, and polarization plane of light passing through first and fourth layers and second and third layers is rotated by 180° or 0°.

20 Claims, 4 Drawing Sheets

# SURFACE LIGHT SOURCE FOR EMITTING LINEARLY-POLARIZED LIGHT WHOSE POLARIZATION PLANE IS VARIED DEPENDING ON EMISSION DIRECTION AND VIEW ANGLE CHANGEABLE LIQUID CRYSTAL DISPLAY APPARATUS USING SAME

BACKGROUND OF THE INVENTION

1. Field of the Invention

The present invention relates to a surface light source for allowing a liquid crystal display apparatus to perform narrow view angle display and wide view angle display, and a liquid crystal display apparatus comprising the surface light source.

2. Description of the Related Art

Liquid crystal display devices have a wide view angle. Therefore, there is a risk that the display thereof might be seen by someone other than the viewer from an oblique direction (a direction inclined from the direction of the normal line of the liquid crystal display device).

As a liquid crystal display apparatus which prevents its display from a peeper, there is proposed such a liquid crystal display apparatus in which a view angle limiting device is disposed at one side of the liquid crystal display device for reducing visibility from a direction inclined from the front forward direction of the liquid crystal display device, so that wide view angle display, and narrow view angle display of high security with no risk of peeing by others, are available (Unexamined Japanese Patent Application KOKAI Publication No. 2004-133334).

The view angle limiting device is structured such that a plurality of regions are formed on both of the facing inner surfaces of a pair of substrates, and electrodes having a predetermined shape are formed correspondingly to the respective regions. In each region, liquid crystal molecules of a liquid crystal layer sealed between the pair of substrates are aligned in an alignment state having a view angle in a direction inclined to one side from the direction of the normal line of the liquid crystal display device, and in an alignment state having a view angle in a direction inclined to a side opposite to that side.

This liquid crystal display apparatus limits the view angle of a display image of the liquid crystal display device, by reducing the visibility from an oblique direction by applying a voltage between the electrodes of the view angle limiting device.

That is, when no voltage is applied between the electrodes of the view angle limiting device, i.e., when the view angle limiting device is in a non-display status, the display image of the liquid crystal display device can be seen at a wide view angle. In contrast, when a voltage is applied between the electrodes of the view angle limiting device, there appear displays which correspond to the respective electrodes having the predetermined shape and corresponding to the regions of the view angle limiting device that have a view angle in the direction inclined to one side or corresponding to the regions of the view angle limiting device that have a view angle in the direction inclined to the side opposite to that side, and the display image of the liquid crystal display device is concealed by such displays, when the display image is seen from the direction inclined to one side from the front forward direction and from the direction inclined to the side opposite to that side. Therefore, the display image of the liquid crystal display device becomes unrecognizable from the directions inclined to one side and to the side opposite to that side, and the view angle of the display image is thus seemingly limited, which means that the view angle of the display image is narrowed.

However, the view angle limiting device, in which the liquid crystal molecules are aligned in different alignment states in the respective regions obtained by dividing the area corresponding to the screen of the liquid crystal display device into a plurality of regions, is hard to manufacture, because a complex aligning process (rubbing on aligning films) for imparting different directivities to each region has to be applied to the inner surfaces of the pair of substrates.

SUMMARY OF THE INVENTION

An object of the present invention is to provide a surface light source suitable for a liquid crystal display apparatus which performs narrow view angle display and wide view angle display. Another object of the present invention is to provide a liquid crystal display apparatus of a view angle changeable type, which can perform display selectively with a narrow view angle and with a wide view angle.

To achieve the above objects, a surface light source according to a first aspect of the present invention comprises:

a light source unit which has a light emitting surface, and selectively emits rays of linearly-polarized light having a polarization plane in a predetermined direction and rays of non-polarized light from the light emitting surface; and a retardation element disposed at a light emitting side of the light source unit and comprising a first retardation layer array in which a plurality of first retardation layers and second retardation layers having a predetermined shape are arranged alternately, and a second retardation layer array disposed so as to have a gap from the first retardation layer array and having third retardation layers formed into a shape corresponding to the first retardation layers and arranged correspondingly to the first retardation layers, and fourth retardation layers formed into a shape corresponding to the second retardation layers and arranged correspondingly to the second retardation layers, the retardation element being arranged such that it emits therefrom rays of linearly-polarized light, among the rays of linearly-polarized light emitted from the light source unit, that pass through the first and third retardation layers and the second and fourth retardation layers by transforming the rays into rays of linearly-polarized light having a polarization plane which is substantially orthogonal to the polarization plane of the rays of linearly-polarized light emitted from the light source unit, and it emits therefrom rays of linearly-polarized light that pass through the first and fourth retardation layers and the second and third retardation layers by transforming the rays into rays of linearly-polarized light having a polarization plane which is substantially parallel with the polarization plane of the rays of linearly-polarized light emitted from the light source unit.

Since the surface light source according to the present invention has the light source unit for selectively emitting rays of linearly-polarized light and rays of non-polarized light, and the retardation element which is disposed in front of the light source unit and which emits rays of linearly-polarized light to be emitted in the front forward direction substantially parallel with the normal direction of the surface light source and rays of linearly-polarized light to be emitted in oblique directions inclined from the normal direction as rays of illumination lights whose polarization planes are orthogonal to each other, the surface light source can emit rays of illumination lights comprising rays of linearly-polarized lights whose polarization planes are different from each other, in the front forward direction and in the oblique directions. Accordingly, a liquid crystal display device can perform narrow view angle display by using these illumination lights, and also can perform wide view angle display by using illumination light comprising rays of non-polarized light.

In the present surface light source, it is preferred that the retardation element emit the rays of linearly-polarized light, among the rays of linearly-polarized light emitted from the light source unit, that pass through the first and third retardation layers and the second and fourth retardation layers and are to be emitted in a direction substantially parallel with a normal direction of the retardation element, as rays of first illumination light which comprises rays of linearly-polarized light whose polarization plane has been rotated by substantially 90° from the rays of linearly-polarized light emitted from the light source unit, the retardation element emit the rays of linearly-polarized light, among the rays of linearly-polarized light emitted from the light source unit, that pass through the first and fourth retardation layers and the second and third retardation layers and are to be emitted in oblique directions inclined from the normal direction of the retardation element, as rays of second illumination light which comprises rays of linearly-polarized light whose polarization plane has been rotated by substantially 180° or 0° from the rays of linearly-polarized light emitted from the light source unit, and the retardation element emit the rays of non-polarized light selectively emitted from the light source unit, as rays of third illumination light which comprises rays of non-polarized light having a predetermined range of light diffusion.

In the present surface light source, it is preferred that the first to fourth retardation layers of the retardation element be formed of a plurality of retardation layers whose slow axes run in different directions. In this case, it is preferred that the first to fourth retardation layers of the retardation element be formed of $\lambda/2$ retardation plates for giving a transmission light passing therethrough a retardation of ½ of a wavelength of the transmission light. It is further preferred that the first retardation layers of the retardation element be formed so as to have their slow axis arranged in a direction which intersects the polarization plane of the rays of linearly-polarized light emitted from the light source unit at an angle of substantially 22.5°, which is slant from that polarization plane in one of clockwise and anticlockwise rotational directions, that the second retardation layers be formed so as to have their slow axis arranged in a direction which intersects the polarization plane of the rays of linearly-polarized light emitted from the light source unit at an angle of substantially 22.5°, which is slant from that polarization plane in the other rotational direction, that the third retardation layers be formed so as to have their slow axis arranged in a direction which intersects the slow axis of the first retardation layers at an angle of substantially 45°, which is slant from that slow axis in the one rotational direction, and that the fourth retardation layers be formed so as to have their slow axis arranged in a direction which intersects the slow axis of the second retardation layers at an angle of substantially 45°, which is slant from that slow axis in the other rotational direction. Further, it is preferred that the retardation element comprise: a transparent plate having a predetermined thickness; the first and second retardation layers arranged on one surface of the transparent plate; and the third and fourth retardation layers arranged on the other surface of the transparent plate.

Further, in the present surface light source, it is preferred that the light source unit comprises: a light guide member having a light incident portion from which light enters and a light emitting surface for emitting the light that enters from the light incident portion, for guiding the light that enters from the light incident portion and emitting the light from the light emitting surface; first and second light emitting elements arranged to face the light incident portion of the light guide member, and selectively turned on to light; and a linear polarizing element arranged in a light path of rays of light emitted from either the first or the second light emitting element. In this case, it is preferred that the linear polarizing element be arranged so as to correspond to a light emitting surface of the first light emitting element, and there be a plurality of the first light emitting element and a plurality of the second light emitting element, which are arranged alternately so as to face the light incident portion of the light guide member.

A liquid crystal display apparatus according to a second aspect of the present invention comprises:

a liquid crystal display device having a pair of polarizing plates which are arranged at an observer side and at an opposite side to that side;

a light source unit disposed at the opposite side to the observer side of the liquid crystal display device, and having a light emitting surface, for selectively emitting rays of linearly-polarized light having a polarization plane in a predetermined direction and rays of non-polarized light from the light emitting surface toward the liquid crystal display device; and a retardation element disposed between the liquid crystal display device and the light source unit, and comprising a first retardation layer array in which a plurality of first retardation layers and second retardation layers having a predetermined shape are arranged alternately, and a second retardation layer array disposed so as to have a gap from the first retardation layer array and having third retardation layers formed into a shape corresponding to the first retardation layers and arranged correspondingly to the first retardation layers, and fourth retardation layers formed into a shape corresponding to the second retardation layers and arranged correspondingly to the second retardation layers, the retardation element being arranged such that it emits therefrom rays of linearly-polarized light, among the rays of linearly-polarized light emitted from the light source unit, that pass through the first and third retardation layers and the second and fourth retardation layers by transforming the rays into rays of linearly-polarized light having a polarization plane which is substantially orthogonal to the polarization plane of the rays of linearly-polarized light emitted from the light source unit, and it emits therefrom rays of linearly-polarized light that pass through the first and fourth retardation layers and the second and third retardation layers by transforming the rays into rays of linearly-polarized light having a polarization plane which is substantially parallel with the polarization plane of the rays of linearly-polarized light emitted from the light source unit.

According to the liquid crystal display apparatus of the present invention, since the light source unit for selectively emitting rays of linearly-polarized light and rays of non-polarized light is disposed behind the liquid crystal display device, and the retardation element which emits rays of linearly-polarized light to be emitted in the front forward direction substantially parallel with the normal direction of the light source unit and rays of linearly-polarized light to be emitted in oblique directions inclined from the normal direction as rays of illumination lights whose polarization planes are orthogonal to each other is disposed between the light source unit and the liquid crystal display device, the liquid crystal display apparatus can selectively perform narrow view angle display and wide view angle display.

In the liquid crystal display apparatus according to the present invention, it is preferred that the retardation element comprise: a transparent plate having a predetermined thickness; the first and second retardation layers arranged on one surface of the transparent plate; and the third and fourth retardation layers arranged on the other surface of the transparent plate.

It is preferred that the first to fourth retardation layers of the retardation element be formed of λ/2 retardation layers for giving a transmission light passing therethrough a retardation of ½ of a wavelength of the transmission light, and arranged such that their slow axes run in different directions from one another. In this case, it is preferred that the first retardation layers of the retardation element be formed so as to have their slow axis arranged in a direction which intersects the polarization plane of the rays of linearly-polarized light emitted from the light source unit at an angle of substantially 22.5°, which is slant from that polarization plane in one of clockwise and anticlockwise rotational directions, that the second retardation layers be formed so as to have their slow axis arranged in a direction which intersects the polarization plane of the rays of linearly-polarized light emitted from the light source unit at an angle of substantially 22.5°, which is slant from that polarization plane in the other rotational direction, that the third retardation layers be formed so as to have their slow axis arranged in a direction which intersects the slow axis of the first retardation layers at an angle of substantially 45°, which is slant from that slow axis in the one rotational direction, and that the fourth retardation layers be formed so as to have their slow axis arranged in a direction which intersects the slow axis of the second retardation layers at an angle of substantially 45°, which is slant from that slow axis in the other rotational direction.

In the liquid crystal display apparatus according to the present invention, it is preferred that the first and second retardation layers and third and fourth retardation layers of the retardation element are arranged alternately in two directions which are substantially parallel with a left and right direction and an up and down direction of a screen of the liquid crystal display device. Further, it is preferred that the first and second retardation layers and third and fourth retardation layers of the retardation element are arranged alternately in a direction which is substantially parallel with a left and right direction of a screen of the liquid crystal display device.

In the liquid crystal display apparatus according to the present invention, it is preferred that the light source unit comprise: a light guide member having a light incident portion from which light enters and a light emitting surface for emitting the light that enters from the light incident portion, for guiding the light that enters from the light incident portion and emitting the light from the light emitting surface; first and second light emitting elements arranged to face the light incident portion of the light guide member, and selectively turned on to light; and a linear polarizing element arranged in a light path of rays of light emitted from either the first or the second light emitting element.

It is preferred that of the pair of polarizing plates arranged at both sides of the liquid crystal display device, the polarizing plate at the opposite side to the observer side have its transmission axis arranged in a direction which is substantially parallel with a polarization plane of rays of linearly-polarized light emitted from the retardation element in a normal direction of the retardation element.

A liquid crystal display apparatus according to a third aspect of the present invention comprises:

a liquid crystal display device having a pair of polarizing plates which are arranged at an observer side and at an opposite side to that side;

a first light source unit which is disposed at the opposite side to the observer side of the liquid crystal display device, and selectively emits rays of linearly polarized light having a polarization plane in a predetermined direction toward the liquid crystal display device;

a second light source unit which is disposed between the first light source unit and the liquid crystal display device, and has a light emitting surface, for selectively emitting rays of non-polarized light from the light emitting surface toward the liquid crystal display device; and a retardation element disposed between the liquid crystal display device and the second light source unit, and comprising a first retardation layer array in which a plurality of first retardation layers and second retardation layers having a predetermined shape are arranged alternately, and a second retardation layer array disposed so as to have a gap from the first retardation layer array and having third retardation layers formed into a shape corresponding to the first retardation layers and arranged correspondingly to the first retardation layers, and fourth retardation layers formed into a shape corresponding to the second retardation layers and arranged correspondingly to the second retardation layers, the retardation element being arranged such that it emits therefrom rays of linearly-polarized light, among the rays of linearly-polarized light emitted from the first light source unit, that pass through the first and third retardation layers and the second and fourth retardation layers by transforming the rays into rays of linearly-polarized light having a polarization plane which is substantially orthogonal to the polarization plane of he rays of linearly-polarized light emitted from the first light source unit, and it emits therefrom rays of linearly-polarized light that pass through the first and fourth retardation layers and the second and third retardation layers by transforming the rays into rays of linearly-polarized light having a polarization plane which is substantially parallel with the polarization plane of the rays of linearly-polarized light emitted from the first light source unit.

According to the present liquid crystal display apparatus, since the first light source unit and the second light source unit are prepared as a light source unit, the structure of the light source unit is simplified and narrow view angle display and wide view angle display become available.

In the liquid crystal display apparatus according to the present invention, it is preferred that the first light source unit comprise: a first light guide member having a light incident portion from which light enters and a light emitting surface for emitting the light that enters from the light incident portion, for guiding the light that enters from the light incident portion and emitting the light from the light emitting surface; a first light emitting element arranged to face the light incident portion of the first light guide member, and selectively turned on to light; and a polarizing plate arranged at a side of the light emitting surface of the first light guide member. Further, it is preferred that the second light source unit comprise: a second light guide member having a light incident portion from which light enters and a light emitting surface for emitting the light that enters from the light incident portion, for guiding the light that enters from the light incident portion and emitting the light from the light emitting surface; and a second light emitting element arranged to face the light incident portion of the second light guide member, and selectively turned on to light. It is further preferred that the first light source unit comprises at least one prism sheet, which is disposed between the first light guide member and the polarizing plate, for converging rays of light emitted from the first light guide member toward the liquid crystal display device.

BRIEF DESCRIPTION OF THE DRAWINGS

These objects and other objects and advantages of the present invention will become more apparent upon reading of the following detailed description and the accompanying drawings in which:

FIG. 5A is an explanatory diagram showing the polarization state of light that enters from first retardation layers and FIG. 5B is an explanatory diagram showing the polarization state of light that enters from second retardation layers.

DETAILED DESCRIPTION OF THE PREFERRED EMBODIMENTS

Figure 1:
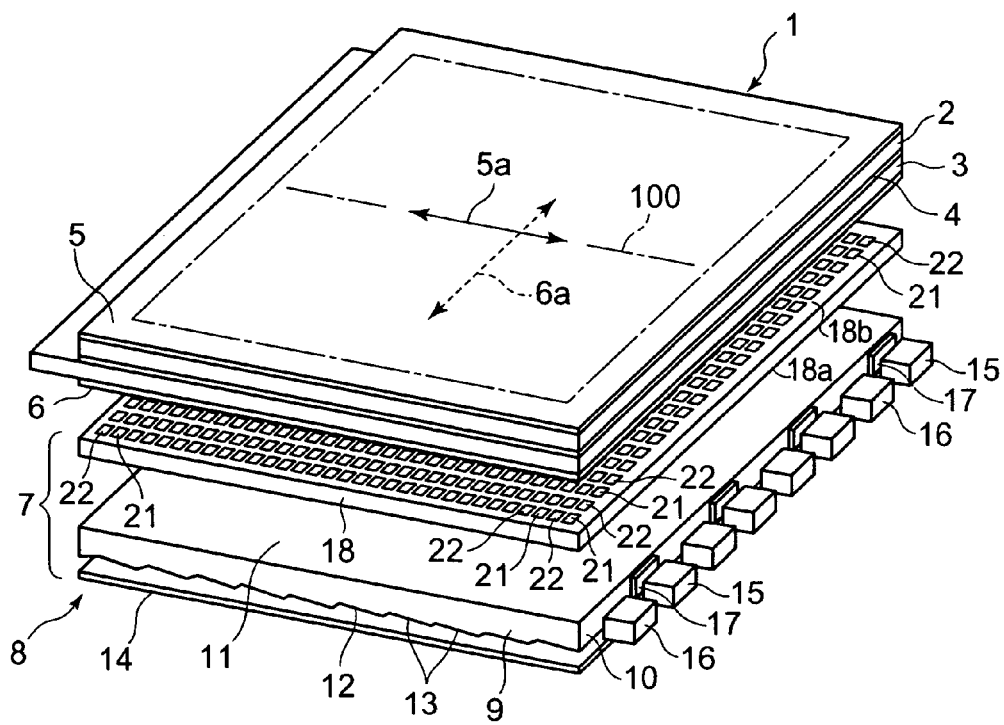
FIG. 1 is a perspective diagram of a liquid crystal display apparatus showing one embodiment of the present invention.
Figure 2:
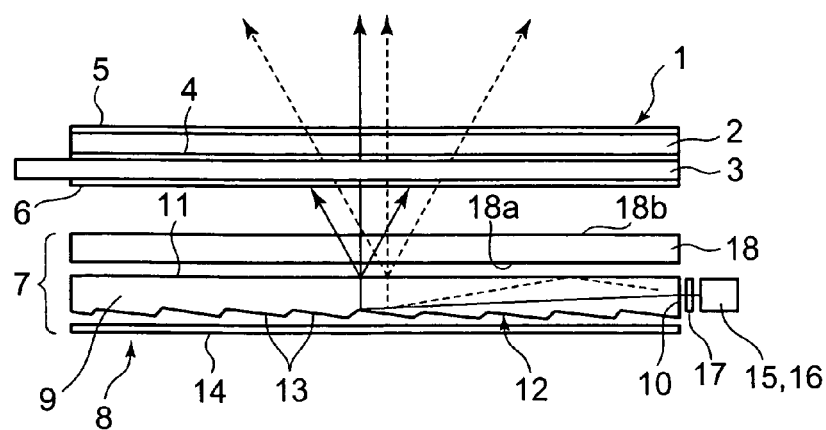
FIG. 2 is a side elevation of the liquid crystal display apparatus.
Figure 3:
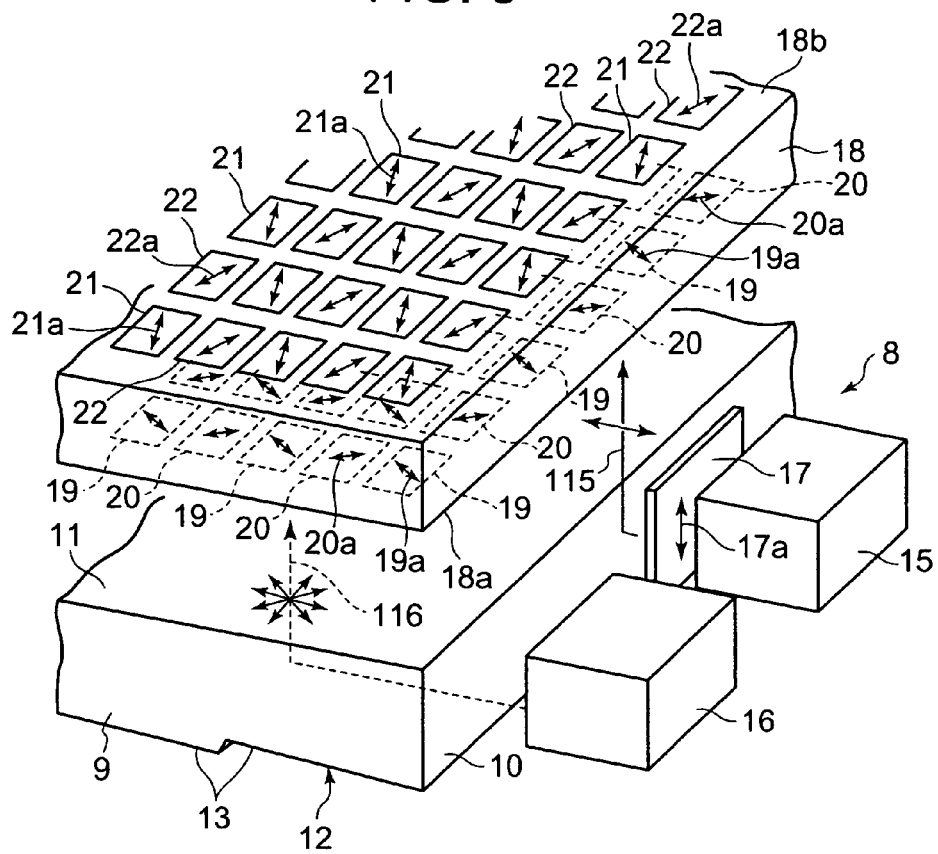
FIG. 3 is a view showing a part of a surface light source of the liquid crystal display apparatus in enlargement.

FIG. 1 to FIG. 5 show one embodiment of the present invention, where FIG. 1 is a perspective diagram of a liquid crystal display apparatus, FIG. 2 is a side elevation of the liquid crystal display apparatus, and FIG. 3 is a view showing a part of a surface light source of the liquid crystal display apparatus in enlargement.

The present liquid crystal display apparatus comprises a liquid crystal display device 1 having a screen region 1a on which a plurality of pixels (unillustrated) for controlling light transmission are arranged in a matrix, and a surface light source 7 which is disposed at a side opposite to the observer side (the upper side in FIG. 1 and FIG. 2) of the liquid crystal display device 1, and which irradiates illumination light toward the liquid crystal display device 1.

The liquid crystal display device 1 is an active matrix liquid crystal display device. Though the illustration of the internal structure is omitted, the liquid crystal display device 1 comprises, on the inner surface of one of a pair of transparent substrates 2 and 3 joined via a frame-like sealing member 4, for example, on the inner surface of the substrate 3 that is on the opposite side to the observer side, a plurality of transparent pixel electrodes arranged in a matrix of a row direction (a left and right direction of the screen) and a column direction (an up and down direction of the screen), a plurality of TFTs (Thin Film Transistors) connected to the pixel electrodes respectively, a plurality of gate lines for supplying a gate signal to the rows of TFTs respectively, and a plurality of data lines for supplying an image data signal to the columns of TFTs respectively. A transparent opposing electrode formed of a monolithic film that faces the plurality of pixel electrodes is provided on the inner surface of the other substrate, i.e., the substrate 2 on the observer side. A liquid crystal layer is sealed in a region enclosed by the sealing member 4 between the pair of substrates 2 and 3.

Further, the liquid crystal display device 1 is a TN liquid crystal display device in which the liquid crystal molecules of the liquid crystal layer are twisted at a tilt angle of substantially 90° between the pair of substrates 2 and 3, and comprises a pair of polarizing plates 5 and 6 disposed on the observer side and the side opposite to that side.

The liquid crystal display device 1 is a device of a normally white mode in which the pair of polarizing plates 5 and 6 are disposed so as to have their transmission axes 5a and 6a cross substantially orthogonally to each other. According to the present embodiment, the transmission axis 5a of the polarizing plate 5 on the observer side runs substantially in parallel with a horizontal axis 100 of the screen, and the transmission axis 6a of the polarizing plate 6 on the opposite side crosses the horizontal axis 100 substantially orthogonally.

The surface light source 7 comprises a light source unit 8 having a light emitting surface 11 for selectively emitting rays of linearly-polarized light having a polarization plane in a predetermined direction and rays of non-polarized light, and a retardation element 18 on the light emitting side of the light source unit 8.

As shown in FIG. 1 to FIG. 3, the light source unit 8 comprises a light guide member 9, a reflecting plate 14, first light emitting elements 15, second light emitting elements 16, and linear polarizing elements 17. The light guide member 9 comprises a light incident portion 10 from which rays of light enter and the light emitting surface 11 for emitting rays of light that have entered from the light incident portion 10, and guides rays of light that enter from the light incident portion 10 therethrough and emits them from the light emitting surface 11. The reflecting plate 14 is disposed at a side opposite to the light emitting surface 11 of the light guide member 9. The first and second light emitting elements 15 and 16 are disposed so as to face the light incident portion 10 of the light guide member 9, and selectively turned on to light. The linear polarizing elements 17 are disposed in the path of rays of light emitted from either the first light emitting elements 15 or the second light emitting elements 16, for example, the first light emitting elements 15.

The light guide member 9 is formed of a transparent plate such as an acrylic rein plate, that has a rectangular plane-view shape corresponding to the screen region 1a of the liquid crystal display device 1. The light guide member 9 has one of its two end surfaces, which are in the direction parallel with the left and right direction of the screen of the liquid crystal display device 1, serve as the light incident portion (hereinafter referred to as light incident end surface) 10, one of its two plate surfaces serve as the light emitting surface 11 formed of a flat surface, and the other of its plate surfaces serve as a reflecting surface 12 which internally reflects rays of light that enter from the light incident end surface 10 toward the light emitting surface 11. Hereinafter, the light guide member 9 will be referred to as light guide plate.

The reflecting surface 12 of the light guide plate 9 is formed of a serrated surface on which a plurality of inclined surfaces 13 are formed at a predetermined pitch along the lengthwise direction of the light plate 9. The inclined surfaces 13 have a belt-like plan-view shape which is parallel with the lengthwise direction (the widthwise direction of the light guide plate 9) of the light incident end surface 10, and are inclined in such a direction in which the inclined surfaces 13 are closer to the light emitting surface 11 at the side of the other end surface of the light guide plate 9 than at the side of the light incident end surface 10.

The light guide plate 9 is for reflecting rays of light that enter from the light incident end surface 10 on the inclined surfaces 13 of the reflecting surface 12 in the directions around the direction of the normal line of the light emitting surface 11, and emitting them from the light emitting surface 11. The light guide plate 9 emits rays of illumination light which has an intensity distribution in which the peak of the intensity of the light to be emitted appears in the normal direction of the light emitting surface 11.

The first and second light emitting elements 15 and 16 are solid light emitting elements comprising, for example, LEDs (Light Emitting Diodes), and a plurality of the first light emitting elements 15 and the second light emitting elements 16 (four elements for each type in FIG. 1) are arranged alternately at the external side of the light incident end surface 10 of the light guide plate 9 in the lengthwise direction of the light entrance end surface 10.

The linear polarizing elements 17 are formed of a polarizing plate having a transmission axis 17a, and arranged between the first light emitting elements 15 and the light incident end surface 10 of the light guide plate 9, so as to correspond to the plurality of first light emitting elements 15 respectively.

The light source unit 8 selectively drives the plurality of first light emitting elements 15 and the plurality of second light emitting elements 16 to light, by an unillustrated light source drive circuit. By lighting the plurality of first light emitting elements 15, the light source unit 8 transforms the rays of light emitted from the light emitting elements 15 into rays of linearly-polarized light by making them pass through the linear polarizing plates 17, and makes them enter the light guide plate 9 from the light incident end surface 10 to be emitted from the light emitting surface 11 of the light guide plate 9 as rays of linearly-polarized light 115. By lighting the plurality of second light emitting elements 16, the light source unit 8 makes the rays of light emitted from the light emitting elements 16 enter the light guide plate 9 from the light incident end surface 10, and emits them from the light emitting surface 11 of the light guide plate 9 as rays of non-polarized light 116.

According to the present embodiment, the transmission axis 17a of the linear polarizing elements 17 is laid substantially in parallel with the normal direction of the light emitting surface 11 of the light guide plate 9 as shown in FIG. 3, so that the rays of linearly-polarized light 115, which have a polarization plane substantially parallel with the left and right direction of the screen of the liquid crystal display device 1, may be emitted from the light emitting surface 11 of the light guide plate 9 when the first light emitting elements 15 are lit.

The retardation element 18 disposed at the light emitting side of the light source unit 8 comprises an optical element which has a surface 18a facing the light source unit 8 (a surface facing the light emitting surface 11 of the light guide plate 9) and an opposite surface 18b opposite to the surface 18a of the retardation element 18 that faces the light source unit 8, on which surfaces retardation layers of four kinds, which have their slow axes laid in different directions, are arranged. A plurality of first retardation layers 19 having a predetermined shape and having their slow axis laid in a first direction and a plurality of second retardation layers 20 having a predetermined shape and having their slow axis laid in a second direction are arranged on the surface 18a of the retardation element 18 alternately in at least one direction, thereby forming a first retardation array. A plurality of third retardation layers 21 having a shape corresponding to the shape of the first retardation layers 19 and having their slow axis laid in a third direction and a plurality of fourth retardation layers 22 having a shape corresponding to the shape of the second retardation layers 20 and having their slow axis laid in a fourth direction are arranged on the opposite surface 18b of the retardation element 18 such that the third retardation layers 21 face the first retardation layers 19 and the fourth retardation layers 22 face the second retardation layers 20, thereby forming a second retardation array. The first to fourth retardation layers 19, 20, 21, and 22 are each so set as to rotate the polarization plane of rays of light that pass through the first and third retardation layers 19 and 21 and rays of light that pass through the second and fourth retardation layers 20 and 22, among the rays of the linearly-polarized light 115 emitted from the light source unit 8, by substantially 90°, and to rotate the polarization plane of rays of light that pass through the first and fourth retardation layers 19 and 22 and rays of light that pass through the second and third retardation layer 20 and 21 by substantially 0° or 180°.

The retardation element 18 according to the present embodiment is structured such that the plurality of first and second retardation layers 19 and 20, and third and fourth retardation layers 21 and 22, which each have a rectangular dot shape, are arranged alternately in two directions which are substantially parallel with the left and right direction and up and down direction of the screen of the liquid crystal display device 1. The first and second retardation layers 19 and 20, and the third and fourth retardation layers 21 and 22 are arranged in the above-described two directions, at as small a pitch as possible, for example, at an equal pitch to the pitch of the pixels of the liquid crystal display device 1, or at a pitch several times as large as the pitch of the pixels.

The retardation element 18 is formed of a transparent sheet giving substantially no birefringence to a ray of light passing therethrough, on one surface and the other surface of which the retardation layers (hereinafter referred to as λ/2 retardation layers) 19 and 20 and 21 and 22 for giving a phase difference amounting to ½ of the wavelength between ordinary rays of light and extraordinary rays of light, are formed. The λ/2 retardation layers 19 and 20 and 21 and 22 are formed by adhering a plurality of λ/2 retardation films having a rectangular shape and cut out from a uniaxially-stretched film onto the transparent sheet, or by printing polymer liquid crystal on the transparent sheet to form rectangular shapes, and polymerizing the polymer liquid crystal such that the liquid crystal molecules are aligned to have their longer axis oriented in one predetermined direction.

Figure 4:
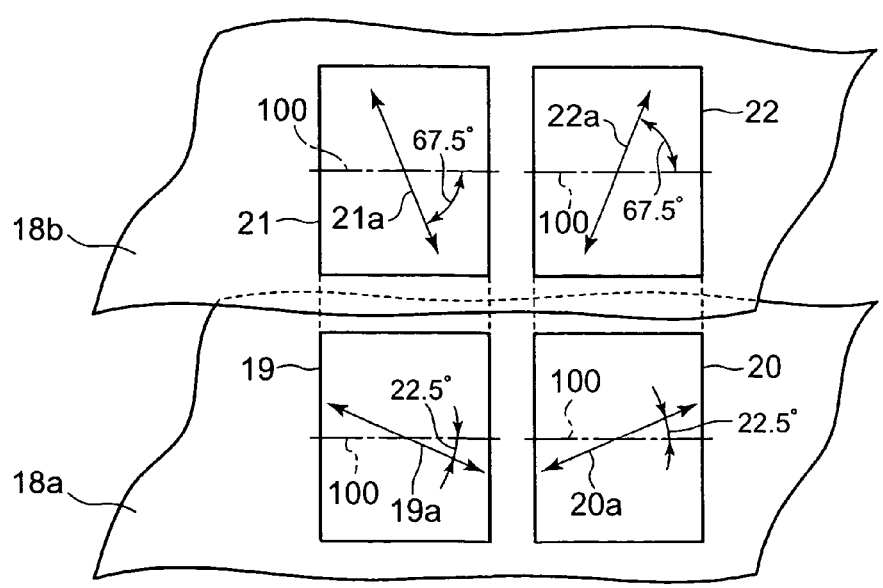
FIG. 4 is an explanatory diagram showing the directions of slow axes of respective retardation layers of a retardation element of the surface light source.

FIG. 4 shows the directions of slow axes 19a and 20a and 21a and 22a of the λ/2 retardation layers 19 and 20 and 21 and 22 of the retardation element 18. Among the λ/2 retardation layers 19 and 20 that are formed on the surface 18a of the retardation element 18 that faces the light source unit 8, the first λ/2 retardation layers 19 have their slow axis 19a laid in a direction which intersects the horizontal axis 100 of the screen of the liquid crystal display device 1, i.e., intersects the polarization plane of the linearly-polarized light 115 emitted from the light source unit 8 at an angle of 22.5°, which is slant clockwise as seen from the observer side, and the second λ/2 retardation layers 20 have their slow axis 20a laid in a direction which intersects the horizontal axis 100 of the screen (the polarization plane of the linearly-polarized light 115 emitted from the light source unit 8) at an angle of 22.5°, which is slant anticlockwise as seen from the observer side.

Among the third and fourth λ/2 retardation layers 21 and 22 formed on the opposite surface 18b of the retardation element 18 that is opposite to the surface 18a facing the light source unit 8, the third λ/2 retardation layers 21 facing the first λ/2 retardation layers 19 have their slow axis 21a laid in a direction which intersects the horizontal axis 100 of the screen at an angle of 65.5°, which is slant clockwise as seen from the observer side, i.e., in a direction further slant clockwise to intersect the slow axis 19a of the first λ/2 retardation layers 19 at an angle of 45°, and the fourth λ/2 retardation layers 22 facing the second λ/2 retardation layers 20 have their slow axis 22a laid in a direction which intersects the horizontal axis 100 of the screen at an angle of 65.5°, which is slant anticlockwise as seen from the observer side, i.e., in a direction further slant anticlockwise to intersect the slow axis 20a of the second λ/2 retardation layers 20 at an angle of 45°.

The surface light source 7 having the above-described structure emits the rays of linearly-polarized light 115 that are emitted from the light source unit 8 in the normal direction of the retardation element 18, by transforming them into rays of first illumination light comprising rays of linearly-polarized light whose polarization plane is substantially orthogonal to the linearly-polarized light 115 emitted from the light source unit 8, by means of the first and third retardation layers 19 and 21, and the second and fourth retardation layers 20 and 22. Further, the surface light source 7 emits the rays of linearly-polarized light 115 that are emitted from the light source unit 8 obliquely in the direction in which the rays will pass through the first and fourth retardation layers 19 and 22 and in the direction in which the rays will pass through the second and third retardation layers 20 and 21, by transforming them into rays of second illumination light comprising rays of linearly-polarized light whose polarization plane is substantially parallel with the polarization plane of the linearly-polarized light 115, by means of the first and fourth retardation layers 19 and 22, and the second and third retardation layers 20 and 21. Further, the surface light source 7 emits rays of non-polarized light emitted from the light source unit 8, as rays of third illumination light comprising rays of non-polarized light that have a predetermined range of light diffusion.

Figure 5A:
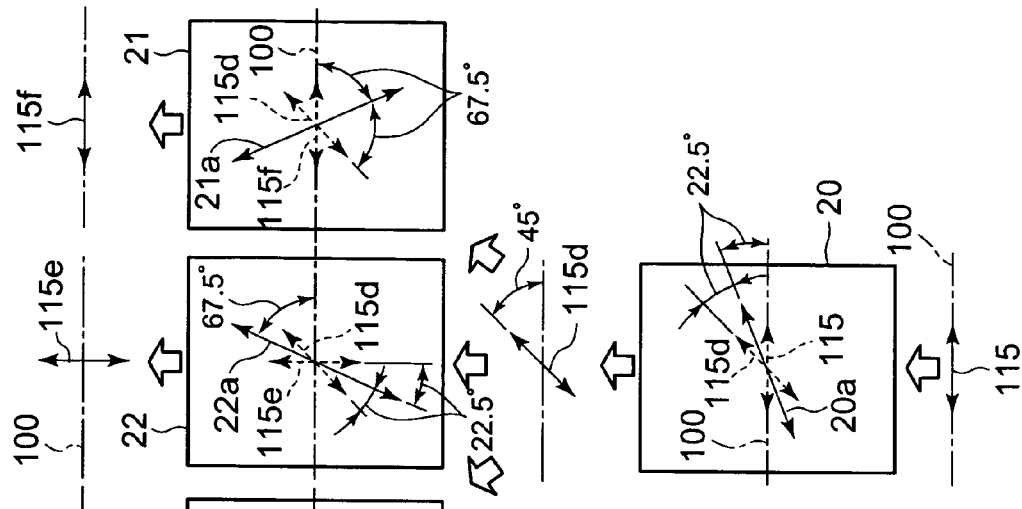
FIGS. 5A and 5B are diagrams exemplarily showing the changes of a polarization plane of linearly-polarized light emitted from a light source unit of the surface light source, where
Figure 5B:
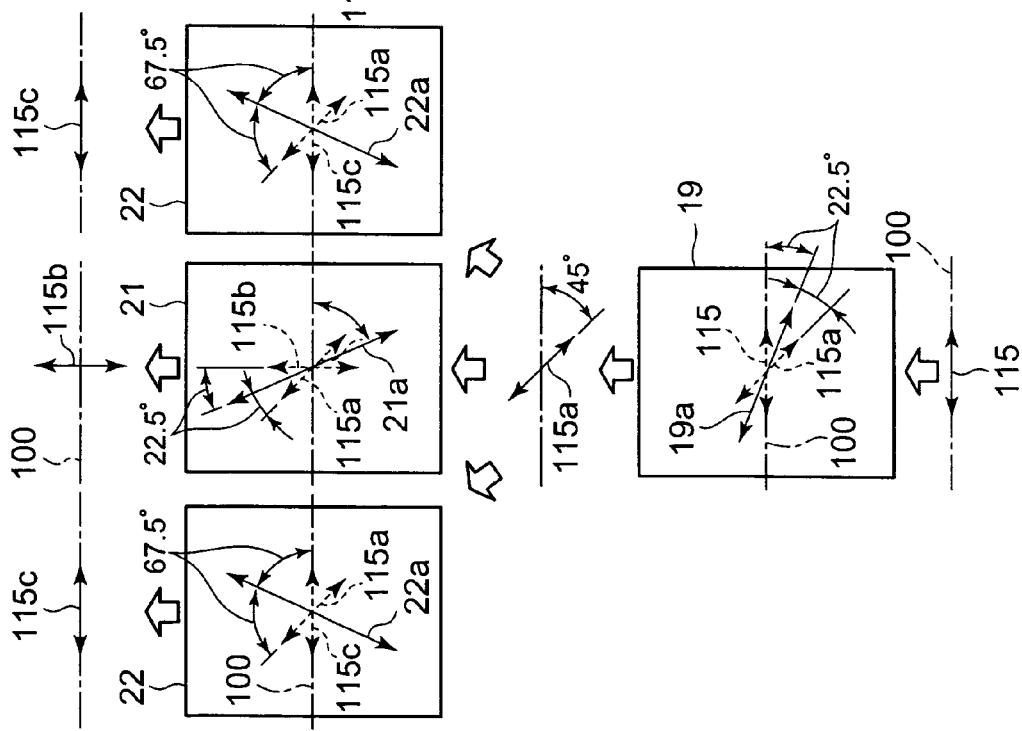

FIGS. 5A and 5B are diagrams exemplarily showing the changes of the polarization plane of the linearly polarized light 115 emitted from the light source unit 8 of the surface light source 7. FIG. 5A shows the changes of the polarization plane of the rays of linearly-polarized light 115 that enter the retardation element 18 from the portions at which the first λ/2 retardation layers 19 are formed, and FIG. 5B shows the changes of the polarized surface of the rays of linearly-polarized light 115 that enter the retardation element 18 from the portions at which the second λ/2 retardation layers 20 are formed.

As shown in FIG. 5A, among the rays of linearly-polarized light 115 emitted from the light source unit 8, the rays of light, which enter the first λ/2 retardation layers 19 of the retardation element 18 and have a retardation surface which intersects the slow axis 19a at an angle of 22.5° slant anticlockwise, have their polarization plane rotated clockwise by the first λ/2 retardation layers 19 to be at an angle of 22.5° with respect to the slow axis 19a and are emitted from the first λ/2 retardation layers 19 as transformed into rays of linearly-polarized light 115a whose polarization plane has been rotated clockwise by substantially 45° with respect to the linearly-polarized light 115 from the light source unit 8.

Then, the rays of light that have been emitted from the light source unit 8 in the normal direction of the retardation element 18 enter the third λ/2 retardation layers 21 facing the first λ/2 retardation layers 19 as rays of light that have a polarization plane which intersects the slow axis 21a of the third λ/2 retardation layers 21 at an angle of 22.5° slant anticlockwise, and are emitted from the third λ/2 retardation layers 21 as transformed into rays of light 115b having a polarization plane which is rotated clockwise by the third λ/2 retardation layers 21 to be at an angle of 22.5° with respect to the slow axis 21a. That is, the retardation element 18 emits the rays of linearly-polarized light 115 that have been emitted from the light source unit 8 in the normal direction of the retardation element 18 toward the liquid crystal display device 1, by transforming them into rays of linearly-polarized light whose polarization plane has been rotated by 90°, i.e., into rays of linearly-polarized light 115b whose polarization plane is substantially orthogonal to the rays of linearly polarized light 115 emitted from the light source unit 8.

Meanwhile, the rays of light that have been emitted from the light source unit 8 in oblique directions inclined leftward or rightward from the normal line of the retardation element 18 in which directions the rays of light will pass through the first λ/2 retardation layers 19 and the fourth λ/2 retardation layers 22 adjacent to the third λ/2 retardation layers 21 facing the first λ/2 retardation layers 19 enter the fourth λ/2 retardation layers 22 as transformed into rays of linearly-polarized light 115a whose polarization plane has been rotated clockwise by the first λ/2 retardation layers 19 by 45°. The rays of linearly-polarized light 115a, which enter the fourth λ/2 retardation layers 22 at an angle of 67.5° slant anticlockwise from the slow axis 22a of the fourth λ/2 retardation layers 22, are emitted from the retardation element 18 with their polarization plane rotated clockwise by the fourth λ/2 retardation layers 22 to be at an angle of 67.5° with respect to the slow axis 22a. That is, the retardation element 18 emits the rays of linearly-polarized light 115 that have been emitted from the light source unit 8 in the above-described oblique directions toward the liquid crystal display device 1 in the oblique directions, by transforming them into rays of linearly-polarized light 115c whose polarization plane has been rotated by 180° or 0°, i.e., into rays of linearly-polarized light 115c whose polarization plane is substantially parallel with the linearly-polarized light 115 emitted from the light source unit 8.

Further, as shown in FIG. 5B, among the rays of linearly-polarized light 115 emitted from the light source unit 8, the rays of light, which enter the second λ/2 retardation layers 20 of the retardation element 18 and have a polarization plane which intersects the slow axis 20a of the second λ/2 retardation layers 20 at an angle of 22.5° slant clockwise, have their polarization plane rotated anticlockwise by the second λ/2 retardation layers 20 to be at an angle of 22.5° with respect to the slow axis 20a and are emitted from the second λ/2 retardation layers 20 as transformed into rays of linearly-polarized light 115d whose polarization plane has been rotated anticlockwise by substantially 45° from the rays of linearly-polarized light 115 emitted from the light source unit 8.

Then, the rays of light that have been emitted from the light source unit 8 in the normal direction of the retardation element 18 enter the fourth λ/2 retardation layers 22 facing the second λ/2 retardation layers 20 as rays of light that have a polarization plane which intersects the slow axis 22a of the fourth λ/2 retardation layers 22 at an angle of 22.5° slant clockwise, and are emitted from the fourth λ/2 retardation layers 22 as transformed into rays of light 115e whose polarization plane has been rotated anticlockwise by the fourth λ/2 retardation layers 22 to be at an angle of 22.5° with respect to the slow axis 22a. That is, the retardation element 18 emits the rays of linearly-polarized light 115 that have been emitted from the light source unit 8 in the normal direction of the retardation element 18 toward the liquid crystal display device 1, by transforming them into rays of linearly-polarized light whose polarization plane has been rotated by 90°, i.e., into rays of linearly-polarized light 115e whose polarization plane is substantially orthogonal to the rays of linearly-polarized light 115 emitted from the light source unit 8.

Meanwhile, the rays of light that have been emitted from the light source unit 8 and enter the retardation element 18 from oblique directions that are inclined either leftward or rightward from the normal line of the retardation element 18 in which directions the rays of light will pass through the second λ/2 retardation layers 20 and the third λ/2 retardation layers 21 adjacent to the fourth λ/2 retardation layers 22 facing the second λ/2 retardation layers 20 enter the third λ/2 retardation layers 21 as transformed into rays of linearly-polarized light 115d whose polarization plane has been rotated anticlockwise by the second λ/2 retardation layers 20 by 45°. The rays of linearly-polarized light 115d whose polarization plane intersects the slow axis 21a of the third λ/2 retardation layers 21 at an angle of 67.5° slant clockwise are emitted from the retardation element 18 with their polarization plane rotated anticlockwise by the third λ/2 retardation layers 21 to be at an angle of 67.5° with respect to the slow axis 21a of the third λ/2 retardation layers 21. That is, the retardation element 18 emits the rays of linearly-polarized light 115 emitted from the light source unit 8 in the above-described oblique directions toward the liquid crystal display device 1 in the oblique directions by transforming them into rays of linearly-polarized light 115f whose polarization plane has been rotated by 180° or 0°, i.e. into rays of linearly-polarized light 115f whose polarization plane is substantially parallel with the rays of linearly-polarized light 115 emitted from the light source unit 8.

When rays of non-polarized light are emitted from the light source unit 8, both rays of light that go in the normal direction of the retardation element 18 and rays of light that go in the directions inclined from the normal direction pass through the first and second λ/2 retardation layers 19 and 20 and the third and fourth λ/2 retardation layers 21 and 22 of the retardation element 18 remaining un-polarized, and are emitted toward the liquid crystal display device 1 unchanged from the rays of non-polarized light 116.

As described above, when the rays of linearly-polarized light 115 are emitted from the light source unit 8, the surface light source 7 emits, in the normal direction of the retardation element 18, rays of first illumination light comprising the rays of linearly-polarized lights 115b and 115e which are substantially orthogonal to the rays of linearly-polarized light 115 emitted from the light source unit 8, and also emits, in the directions inclined from the normal direction of the retardation element 18, rays of second illumination light comprising the rays of linearly-polarized lights 115c and 115f which are substantially parallel with the rays of linearly-polarized light 115 emitted from the light source unit 8. Further, when the rays of non-polarized light 116 are emitted from the light source unit 8, the surface light source 7 emits rays of third illumination light comprising the rays of non-polarized light 116 in the normal direction of the retardation element 18 and in the directions inclined from the normal direction.

Therefore, it is possible to make the liquid crystal display apparatus perform narrow view angle display and wide view angle display, by arranging the surface light source 7 at the side opposite to the observer side of the liquid crystal display device 1 such that the opposite surface 18b of the retardation element 18 faces the liquid crystal display device 1, and by arranging the rays of linearly-polarized light 115 emitted from the light source unit 8 such that the polarization plane of the rays is substantially orthogonal to the transmission axis 6a of the polarizing plate 6 disposed at the side opposite to the observer side of the liquid crystal display device 1.

Furthermore, the surface light source 7 can be manufactured more easily than conventional view angle limiting devices, because the surface light source 7 is constituted by the light source unit 8 which selectively emits the rays of linearly-polarized light 115 and the rays of non-polarized light 116, and the retardation element 18 which is disposed at the light emitting side of the light source unit 8 and has the surface 18a facing the light source unit 8 on which the plurality of first λ/2 retardation layers 19 and second λ/2 retardation layers 20 are formed alternately side by side, and the opposite surface 18b opposite to the surface 18a facing the light source unit 8 on which the plurality of third λ/2 retardation layers 21 are formed to correspond to the plurality of first λ/2 retardation layers 19 respectively, and the plurality of fourth λ/2 retardation layers 22 are formed to correspond to the plurality of second λ/2 retardation layers 20 respectively.

Further, the light source unit 8 of the surface light source 7 according to the present embodiment comprises the light guide plate 9 having the light incident end surface 10 from which rays of light enter and the light emitting surface 11 for emitting the rays of light that enter from the light incident end surface 10, for guiding the rays of light that enter from the light incident end surface 10 to be emitted from the light emitting surface 11, the first and second light emitting elements 15 and 16 which are disposed so as to face the light incident end surface 10 of the light guide plate 9 and selectively turned on to light, and the linear polarizing elements 17 disposed in the light path of the rays of light emitted from the first light emitting elements 15 of the first and second light emitting elements 15 and 16. Thus, it is possible to make the rays of linearly-polarized lights 115b and 115e be emitted by turning on the first light emitting elements 15, and to make the rays of non-polarized light 116 be emitted by turning on the second light emitting elements 16.

The liquid crystal display apparatus according to the present embodiment comprises the liquid crystal display device 1 provided with the polarizing plates 5 and 6 at its observer side and at the side opposite to that side, and the surface light source 7, which is disposed at the side opposite to the observer side of the liquid crystal display device 1. And the liquid crystal display apparatus is arranged such that the opposite surface 18b of the retardation element 18 faces the liquid crystal display device 1 and such that the polarization plane of the rays of linearly-polarized light 115 emitted from the light source unit 8 is substantially orthogonal to the transmission axis 6a of the polarizing plate 6 disposed at the opposite side to the observer side of the liquid crystal display device 1. According to this liquid crystal display apparatus, when the rays of linearly-polarized light 115 are emitted from the light source unit 8, rays of linearly-polarized light which are substantially orthogonal to the rays of linearly-polarized light 115 emitted from the light source unit 8, i.e., rays of first illumination light comprising the rays of linearly-polarized lights 115b and 115e whose polarization plane is substantially parallel with the transmission axis 6a of the polarizing plate 6 at the opposite side of the liquid crystal display device 1 are emitted from the opposite surface 18b of the retardation element 18 toward the liquid crystal display device 1 in the normal direction of the retardation element 18, and rays of linearly-polarized light which are substantially parallel with the rays of linearly-polarized light 115 emitted from the light source unit 8, i.e., rays of second illumination light comprising the rays of linearly-polarized lights 115c and 115f which are substantially orthogonal to the transmission axis 6a of the polarizing plate 6 at the opposite side of the liquid crystal display device 1 are emitted from the opposite surface 18b of the retardation element 18 in the directions inclined from the normal direction. And when the rays of non-polarized light 116 are emitted from the light source unit 8, rays of third illumination light comprising the rays of non-polarized light 116 are emitted from the opposite surface 18b of the retardation element 18 toward the liquid crystal display device 1 in the normal direction of the retardation element 18 and in the directions inclined from the normal direction. Thereby, the liquid crystal display apparatus can perform narrow view angle display and wide view angle display.

That is, when the rays of linearly-polarized light 115 are emitted from the light source unit 8 of the surface light source 7 and thereby the rays of first illumination light comprising the rays of linearly-polarized lights 115b and 115e are emitted from the opposite surface 18b of the retardation element 18 in the normal direction of the retardation element 18 and the rays of second illumination light comprising the rays of linearly-polarized lights 115c and 115f are emitted from the opposite surface 18b of the retardation element 18 in the directions inclined from the normal direction, the rays of first illumination light, of the first and second illumination lights, that comprise the rays of linearly-polarized lights 115b and 115e which are substantially parallel with the transmission axis 6a of the polarizing plate 6 at the opposite side of the liquid crystal display device 1 pass through the polarizing plate 6 at the opposite side to enter the liquid crystal display device 1, as shown by the solid arrows in FIG. 2. On the other hand, the rays of second illumination light comprising the rays of linearly-polarized lights 115c and 115f which are substantially orthogonal to the transmission axis 6a of the polarizing plate 6 at the opposite side are absorbed into the polarizing plate 6 at the opposite side.

Accordingly, in this case, since only the rays of first illumination light serve for the displaying operation of the liquid crystal display device 1 and rays of image light are emitted only within a limited angular range spread substantially toward the front forward direction (including the normal line of the liquid crystal display device 1 and directions slightly inclined from the normal line) of the liquid crystal display device 1, the view angle of the displayed image is narrowed.

Meanwhile, when the rays of non-polarized light 116 are emitted from the light source unit 8 of the surface light source 7 and thereby the rays of third illumination light comprising the rays of non-polarized light 116 are emitted from the opposite surface 18b of the retardation element 18, the rays of third illumination light that are emitted in the normal direction of the retardation element 18 and in the directions greatly inclined from the normal direction as shown by the broken arrows in FIG. 2 enter the liquid crystal display device 1 as rays of linearly-polarized light that have passed through the polarizing plate 6 at the opposite side. Therefore, rays of image light are emitted in the front forward direction of the liquid crystal display device 1 and in the directions inclined from the front forward direction, making the view angle of the displayed image wide.

Switching between narrow view-angle display and wide view angle display of the present liquid crystal display apparatus may be done by providing a view angle selection key on an electronic apparatus such as a portable phone, etc. on which the liquid crystal display apparatus is mounted. For example, the light source unit 8 of the surface light source 7 is caused to emit the rays of linearly-polarized light 115 when narrow view angle display is selected by the view angle selection key, and caused to emit the rays of non-polarized light 116 when wide view angle display is selected.

Since the present liquid crystal display apparatus performs narrow view angle display and wide view angle display by means of the surface light source 7 which can be manufactured more easily than conventional view angle limiting device, it is possible to greatly reduce the cost, compared with conventional view angle changeable liquid crystal display apparatus.

Further, since the present liquid crystal display apparatus is formed such that the first and second λ/2 retardation layers 19 and 20 and third and fourth λ/2 retardation layers 21 and 22 of the retardation element 18 of the surface light source 7 are arranged alternately in two directions which are substantially parallel with the left and right direction and up and down direction of the screen of the liquid crystal display device 1, it can perform narrow view angle display with no risk of being peeped by others from any of the left and right direction and up and down direction of the screen.

The retardation element 18 of the surface light source 7 is not limited to that of the above-described embodiment, but may be formed such that, for example, a plurality of first and second λ/2 retardation layers and third and fourth λ/2 retardation layers which each have an elongate shape substantially parallel with the up and down direction of the screen of the liquid crystal display device 1 are formed alternately side by side in the left and right direction of the screen. With a surface light source having this structure, it is possible to perform narrow view angle display with no risk of being peeped by others from the left and right direction of the screen.

The light source unit 8 of the surface light source 7 is not limited to that of the above-described embodiment, but may be anything that has a light emitting surface and selectively emits rays of linearly-polarized light having a polarization plane in a predetermined direction and rays of non-polarized light from the light emitting surface.

Figure 6:
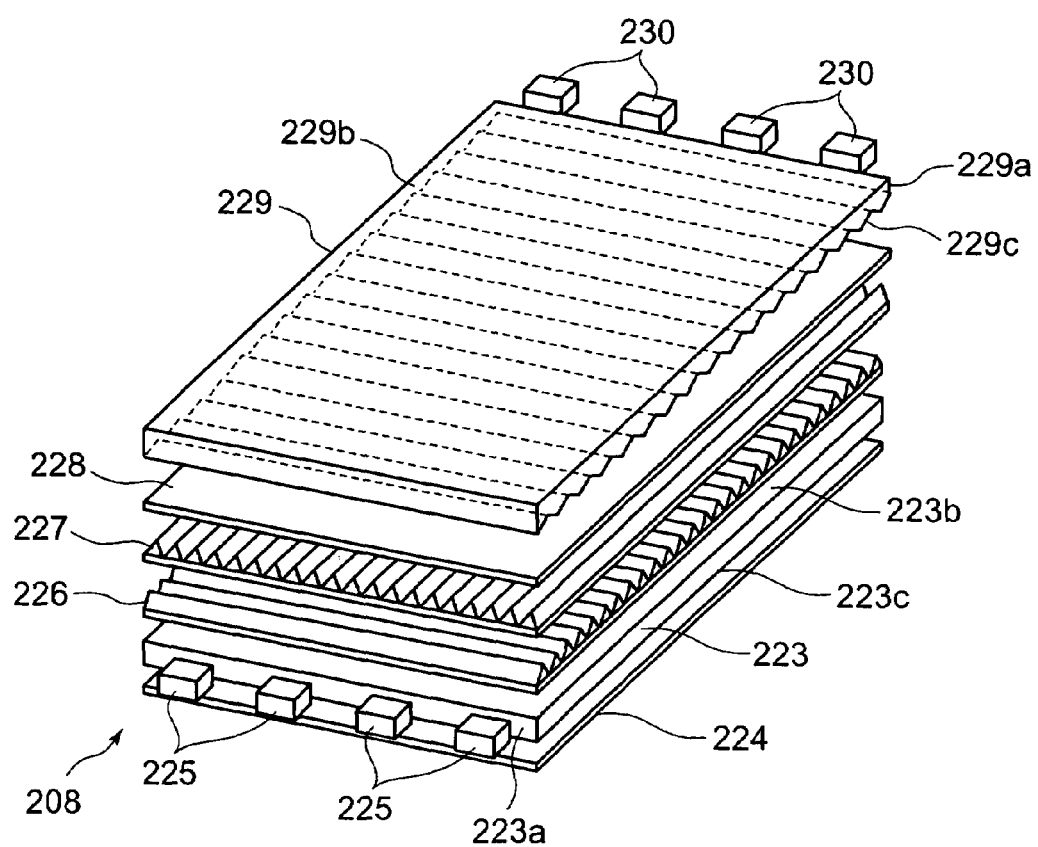
FIG. 6 is a perspective diagram of a light source unit of a surface light source showing another embodiment of the present invention.

FIG. 6 is a perspective diagram of a light source unit of a surface light source showing another embodiment 208 of the present invention. The light source unit 208 of the present embodiment comprises a first light guide member 223 having a light incident portion 223a from which light enters and a light emitting surface 223b for emitting light that enters from the light incident portion 223a, a second light guide member 229 disposed at the light emitting side of the first light guide member 223 and having a light incident portion 229a from which light enters and a light emitting surface 229b for emitting light that enters from the light incident portion 229a, a plurality of first and second light emitting elements (solid light emitting elements comprising, for example, LEDs) 225 and 230 which are disposed to face the light incident portion 223a of the first light guide member 223 and the light incident portion 229a of the second light guide member 229 and selectively turned on to light, and a linear polarizing element 228 disposed between the first light guide member 223 and the second light guide member 229.

The first light guide member 223 is formed of a transparent plate such as an acrylic resin plate or the like, has its one end surface serve as the light incident portion (hereinafter referred to as light incident end surface) 223a, has one of its two plate surfaces serve as the light emitting surface 223b formed of a flat surface, and has the other plate surface serve as a reflecting surface 223c formed of a flat surface for internally reflecting rays of light that enter from the light incident end surface 223a toward the light emitting surface 223b. Hereinafter, the first light guide member 223 will be referred to as first light guide plate.

The first light guide plate 223 internally reflects rays of light that are emitted from the plurality of first light emitting elements 225 and enter thereinto from the light incident end surface 223a on the reflecting surface 223c toward the light emitting surface 223b, and emits them from the light emitting surface 223b. The component 224 is a reflecting plate disposed at the external side of the reflecting surface 223c of the first light guide plate 223.

A first prism sheet 226 having a plurality of elongate prisms that run in one direction and a second prism sheet 227 having a plurality of elongate prisms that run in a direction perpendicular to the one direction, which are for converging the rays of light emitted from the light emitting surface 223b of the first light guide plate 223 to have an intensity distribution in which the peak of the intensity of the light emitted appears in the normal direction of the light emitting surface 223b are disposed at the light emitting side of the first light guide plate 223. The linear polarizing element 228 is disposed at the light emitting side of the second prism sheet 227, and the second light guide member 229 is disposed at the light emitting side of the linear polarizing element 228.

The second light guide member 229 is formed of a transparent plate such as an acrylic resin plate or the like, has its one end surface serve as the light incident portion (hereinafter referred to as light incident end surface) 229a, has one of its two plate surfaces serve as the light emitting surface 229b formed of a flat surface, and has the other plate surface serve as a reflecting surface 229c formed of a serrated surface for internally reflecting the rays of light that enter from the light incident end surface 229a toward the light emitting surface 229b. Hereinafter, the second light guide member 229 will be referred to as second light guide plate.

The second light guide plate 229 internally reflects rays of light that are emitted from the plurality of second light emitting elements 230 and enter thereinto from the light incident end surface 229a on each inclined surface of the serrated reflecting surface 229c substantially in a direction of the normal line of the light emitting surface 229b and emits hem from the light emitting surface 229b. The second light guide plate 229 emits rays of non-polarized light which have an intensity distribution in which the peak of the intensity of the light emitted appear in the normal direction of the light emitting surface 229b.

Further, the second light guide plate 229 allows incidence thereinto of rays of light that are emitted from the light emitting surface 223b of the first light guide plate 223, converted, by the first prism sheet 226 and the second prism sheet 227, to rays of light that have an intensity distribution in which the peak of the intensity of the light emitted appears in the normal direction of the light emitting surface 223b, and then linearly polarized by the linear polarizing element 228, from the reflecting surface 229c of the second light guide plate 229, and emits them form the light emitting surface 229b thereof.

That is, the light source unit 208 according to the present embodiment selectively emits rays of linearly-polarized light having a polarization plane in a predetermined direction (in a direction parallel with the transmission axis of the linear polarizing element 228) and rays of non-polarized light from the light emitting surface 229b of the second light guide plate 229, by selectively lighting the first and second light emitting elements 225 and 230.

Accordingly, provided that the above-described retardation element 18 is disposed at the light emitting side of the light source unit 208, when rays of linearly-polarized light are emitted from the light source unit 208, the retardation element 18 can emit, from its surface opposite to its surface facing the light source unit 208, rays of first illumination light comprising rays of linearly-polarized light which are substantially orthogonal to the rays of linearly-polarized light emitted from the light source unit 208 in the normal direction of the retardation element 18 and rays of second illumination light comprising rays of linearly-polarized light which are substantially parallel with the rays of linearly-polarized light emitted from the light source unit 208 in directions inclined from the normal direction. And when rays of non-polarized light are emitted from the light source unit 208, the retardation element 18 can emit, from its opposite surface, rays of third illumination light comprising rays of non-polarized light in the normal direction of the retardation element 18 and in the directions inclined from the normal direction.

Further, the liquid crystal display apparatus according to the above-described embodiment comprises the liquid crystal display device 1 of a normally white mode. However, the liquid crystal display device 1 may be of a normally black mode. Further, the liquid crystal display device 1 may not only be of a TN type, but may be any of an STN type, a homeotropic alignment type in which the liquid crystal molecules are aligned substantially perpendicularly to the substrate surface, a homogeneous alignment type in which the liquid crystal molecules are not twisted but aligned substantially in parallel with the substrate surface, a bend-alignment type in which the liquid crystal molecules are bend-aligned. Furthermore, the liquid crystal display device 1 may be a ferroelectric or an antiferroelectric liquid crystal display device, or of a transversal electric field type in which first and second electrodes having, for example, a pectinate shape are arranged on the inner surface of either of a pair of substrates to form a plurality of pixels and a transversal electric field (an electric field directed in a direction running along the substrate surface) is produced between the electrodes to change the alignment state of the liquid crystal molecules.

Further, the liquid crystal display apparatus may be a color image display apparatus in which the liquid crystal display device 1 comprises color filters having three colors of red, green, and blue each corresponding to any of the plurality of pixels, or may be a field sequential liquid crystal display apparatus which uses a liquid crystal display device having no color filters.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-286353 filed on Sep. 30, 2005 and including specification, claims, drawings and summary. The disclosure of the above Japanese Patent Application is incorporated herein by reference in its entirety.

What is claimed is:

1. A surface light source, comprising:
a light source unit which has a light emitting surface, and selectively emits rays of linearly-polarized light having a polarization plane in a predetermined direction and rays of non-polarized light from the light emitting surface; and
a retardation element disposed at a light emitting side of the light source unit and comprising
a first retardation layer array in which a plurality of first retardation layers and second retardation layers having a predetermined shape are arranged alternately, and
a second retardation layer array disposed so as to have a gap from the first retardation layer array and having third retardation layers formed into a shape corresponding to the first retardation layers and arranged correspondingly to the first retardation layers, and fourth retardation layers formed into a shape corresponding to the second retardation layers and arranged correspondingly to the second retardation layers, the retardation element being arranged such that it emits therefrom rays of linearly-polarized light, among the rays of linearly-polarized light emitted from the light source unit, that pass through the first and third retardation layers and the second and fourth retardation layers by transforming the rays into rays of linearly-polarized light having a polarization plane which is substantially orthogonal to the polarization plane of the rays of linearly-polarized light emitted from the light source unit, and it emits therefrom rays of linearly-polarized light that pass through the first and fourth retardation layers and the second and third retardation layers by transforming the rays into rays of linearly-polarized light having a polarization plane which is substantially parallel with the polarization plane of the rays of linearly-polarized light emitted from the light source unit.

2. The surface light source according to claim 1, wherein the retardation element emits the rays of linearly-polarized light, among the rays of linearly-polarized light emitted from the light source unit, that pass through the first and third retardation layers and the second and fourth retardation layers and are to be emitted in a direction substantially parallel with a normal direction of the retardation element, as rays of first illumination light which comprises rays of linearly-polarized light whose polarization plane has been rotated by substantially 90° from the rays of linearly-polarized light emitted from the light source unit, the retardation element emits the rays of linearly-polarized light, among the rays of linearly-polarized light emitted from the light source unit, that pass through the first and fourth retardation layers and the second and third retardation layers and are to be emitted in oblique directions inclined from the normal direction of the retardation element, as rays of second illumination light which comprises rays of linearly-polarized light whose polarization plane has been rotated by substantially 180° or 0° from the rays of linearly-polarized light emitted from the light source unit, and the retardation element emits the rays of non-polarized light selectively emitted from the light source unit, as rays of third illumination light which comprises rays of non-polarized light having a predetermined range of light diffusion.

3. The surface light source according to claim 1, wherein the first to fourth retardation layers of the retardation element are formed of a plurality of retardation layers whose slow axes run in different directions.

4. The surface light source according to claim 3, wherein the first to fourth retardation layers of the retardation element are formed of λ/2 retardation plates for giving a transmission light passing therethrough a retardation of ½ of a wavelength of the transmission light.

5. The surface light source according to claim 4, wherein the first retardation layers of the retardation element are formed so as to have their slow axis arranged in a direction which intersects the polarization plane of the rays of linearly-polarized light emitted from the light source unit at an angle of substantially 22.5°, which is slant from that polarization plane in one of clockwise and anticlockwise rotational directions, the second retardation layers are formed so as to have their slow axis arranged in a direction which intersects the polarization plane of the rays of linearly-polarized light emitted from the light source unit at an angle of substantially 22.5°, which is slant from that polarization plane in the other rotational direction, the third retardation layers are formed so as to have their slow axis arranged in a direction which intersects the slow axis of the first retardation layers at an angle of substantially 45°, which is slant from that slow axis in the one rotational direction, and the fourth retardation layers are formed so as to have their slow axis arranged in a direction which intersects the slow axis of the second retardation layers at an angle of substantially 45°, which is slant from that slow axis in the other rotational direction.

6. The surface light source according to claim 1, wherein the retardation element comprises:
a transparent plate having a predetermined thickness;
the first and second retardation layers arranged on one surface of the transparent plate; and
the third and fourth retardation layers arranged on the other surface of the transparent plate.

7. The surface light source according to claim 1, wherein the light source unit comprises:
a light guide member having a light incident portion from which light enters and a light emitting surface for emitting the light that enters from the light incident portion, for guiding the light that enters from the light incident portion and emitting the light from the light emitting surface;
first and second light emitting elements arranged to face the light incident portion of the light guide member, and selectively turned on to light; and
a linear polarizing element arranged in a light path of rays of light emitted from either the first or the second light emitting element.

8. The surface light source according to claim 7, wherein the linear polarizing element is arranged so as to correspond to a light emitting surface of the first light emitting element, and
there are a plurality of the first light emitting element and a plurality of the second light emitting element, which are arranged alternately so as to face the light incident portion of the light guide member.

9. A liquid crystal display apparatus, comprising:
a liquid crystal display device having a pair of polarizing plates which are arranged at an observer side and at an opposite side to that side;
a light source unit disposed at the opposite side to the observer side of the liquid crystal display device, and having a light emitting surface, for selectively emitting rays of linearly-polarized light having a polarization plane in a predetermined direction and rays of non-polarized light from the light emitting surface toward the liquid crystal display device; and
a retardation element disposed between the liquid crystal display device and the light source unit, and comprising
a first retardation layer array in which a plurality of first retardation layers and second retardation layers having a predetermined shape are arranged alternately, and
a second retardation layer array disposed so as to have a gap from the first retardation layer array and having third retardation layers formed into a shape corresponding to the first retardation layers and arranged correspondingly to the first retardation layers, and fourth retardation layers formed into a shape corresponding to the second retardation layers and arranged correspondingly to the second retardation layers, the retardation element being arranged such that it emits therefrom rays of linearly-polarized light, among the rays of linearly-polarized light emitted from the light source unit, that pass through the first and third retardation layers and the second and fourth retardation layers by transforming the rays into rays of linearly-polarized light having a polarization plane which is substantially orthogonal to the polarization plane of the rays of linearly-polarized light emitted from the light source unit, and it emits therefrom rays of linearly-polarized light that pass through the first and fourth retardation layers and the second and third retardation layers by transforming the rays into rays of linearly-polarized light having a polarization plane which is substantially parallel with the polarization plane of the rays of linearly-polarized light emitted from the light source unit.

10. The liquid crystal display apparatus according to claim 9, wherein the retardation element comprises:
a transparent plate having a predetermined thickness;
the first and second retardation layers arranged on one surface of the transparent plate; and
the third and fourth retardation layers arranged on the other surface of the transparent plate.

11. The liquid crystal display apparatus according to claim 9, wherein the first to fourth retardation layers of the retardation element are formed of $\lambda/2$ retardation layers for giving a transmission light passing therethrough a retardation of ½ of a wavelength of the transmission light, and arranged such that their slow axes run in different directions from one another.

12. The liquid crystal display apparatus according to claim 11, wherein the first retardation layers of the retardation element are formed so as to have their slow axis arranged in a direction which intersects the polarization plane of the rays of linearly-polarized light emitted from the light source unit at an angle of substantially 22.5°, which is slant from that polarization plane in one of clockwise and anticlockwise rotational directions, the second retardation layers are formed so as to have their slow axis arranged in a direction which intersects the polarization plane of the rays of linearly-polarized light emitted from the light source unit at an angle of substantially 22.5°, which is slant from that polarization plane in the other rotational direction, the third retardation layers are formed so as to have their slow axis arranged in a direction which intersects the slow axis of the first retardation layers at an angle of substantially 45°, which is slant from that slow axis in the one rotational direction, and the fourth retardation layers are formed so as to have their slow axis arranged in a direction which intersects the slow axis of the second retardation layers at an angle of substantially 45°, which is slant from that slow axis in the other rotational direction.

13. The liquid crystal display apparatus according to claim 9, wherein the first and second retardation layers and third and fourth retardation layers of the retardation element are arranged alternately in two directions which are substantially parallel with a left and right direction and an up and down direction of a screen of the liquid crystal display device.

14. The liquid crystal display apparatus according to claim 9, wherein the first and second retardation layers and third and fourth retardation layers of the retardation element are arranged alternately in a direction which is substantially parallel with a left and right direction of a screen of the liquid crystal display device.

15. The liquid crystal display apparatus according to claim 9, wherein the light source unit comprises:
a light guide member having a light incident portion from which light enters and a light emitting surface for emitting the light that enters from the light incident portion, for guiding the light that enters from the light incident portion and emitting the light from the light emitting surface;
first and second light emitting elements arranged to face the light incident portion of the light guide member, and selectively turned on to light; and
a linear polarizing element arranged in a light path of rays of light emitted from either the first or the second light emitting element.

16. The liquid crystal display apparatus according to claim 9, wherein of the pair of polarizing plates arranged at both sides of the liquid crystal display device, the polarizing plate at the opposite side to the observer side has its transmission axis arranged in a direction which is substantially parallel with a polarization plane of rays of linearly-polarized light emitted from the retardation element in a normal direction of the retardation element.

17. A liquid crystal display apparatus, comprising:
a liquid crystal display device having a pair of polarizing plates which are arranged at an observer side and at an opposite side to that side;
a first light source unit which is disposed at the opposite side to the observer side of the liquid crystal display device, and selectively emits rays of linearly polarized light having a polarization plane in a predetermined direction toward the liquid crystal display device;
a second light source unit which is disposed between the first light source unit and the liquid crystal display device, and has a light emitting surface, for selectively emitting rays of non-polarized light from the light emitting surface toward the liquid crystal display device; and
a retardation element disposed between the liquid crystal display device and the second light source unit, and comprising
a first retardation layer array in which a plurality of first retardation layers and second retardation layers having a predetermined shape are arranged alternately, and
a second retardation layer array disposed so as to have a gap from the first retardation layer array and having third retardation layers formed into a shape corresponding to the first retardation layers and arranged correspondingly to the first retardation layers, and fourth retardation layers formed into a shape corresponding to the second retardation layers and arranged correspondingly to the second retardation layers,
the retardation element being arranged such that it emits therefrom rays of linearly-polarized light, among the rays of linearly-polarized light emitted from the first light source unit, that pass through the first and third retardation layers and the second and fourth retardation layers by transforming the rays into rays of linearly-polarized light having a polarization plane which is substantially orthogonal to the polarization plane of the rays of linearly-polarized light emitted from the first light source unit, and it emits therefrom rays of linearly-polarized light that pass through the first and fourth retardation layers and the second and third retardation layers by transforming the rays into rays of linearly-polarized light having a polarization plane which is substantially parallel with the polarization plane of the rays of linearly-polarized light emitted from the first light source unit.

18. The liquid crystal display apparatus according to claim 17,
wherein the first light source unit comprises:
a first light guide member having a light incident portion from which light enters and a light emitting surface for emitting the light that enters from the light incident portion, for guiding the light that enters from the light incident portion and emitting the light from the light emitting surface;
a first light emitting element arranged to face the light incident portion of the first light guide member, and selectively turned on to light; and
a polarizing plate arranged at a side of the light emitting surface of the first light guide member.

19. The liquid crystal display apparatus according to claim 17,
wherein the second light source unit comprises:
a second light guide member having a light incident portion from which light enters and a light emitting surface for emitting the light that enters from the light incident portion, for guiding the light that enters from the light incident portion and emitting the light from the light emitting surface; and
a second light emitting element arranged to face the light incident portion of the second light guide member, and selectively turned on to light.

20. The liquid crystal display apparatus according to claim 18,
wherein the first light source unit comprises at least one prism sheet, which is disposed between the first light guide member and the polarizing plate, for converging rays of light emitted from the first light guide member toward the liquid crystal display device.

* * * * *